INVENTORS
ERNST MÜLLER
GERHARD SEULEN

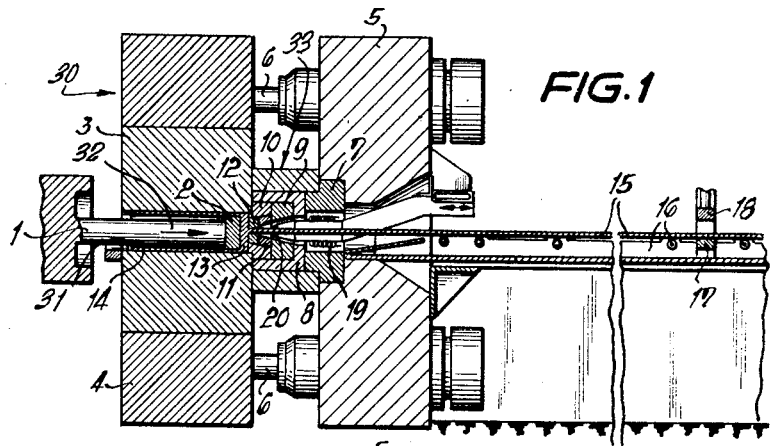
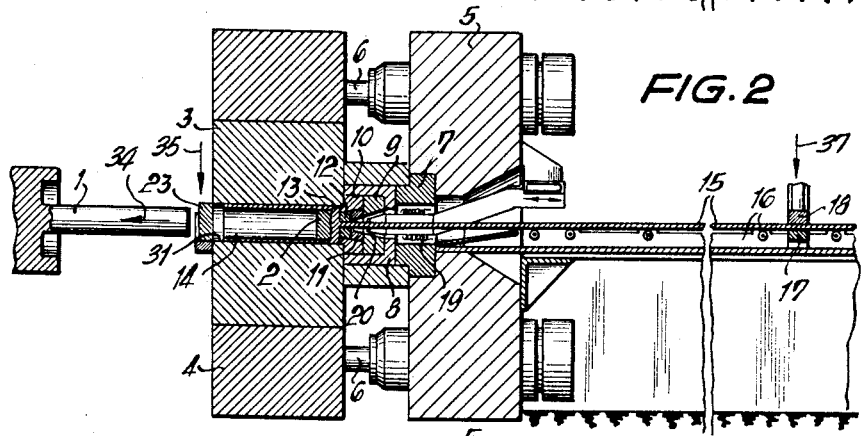
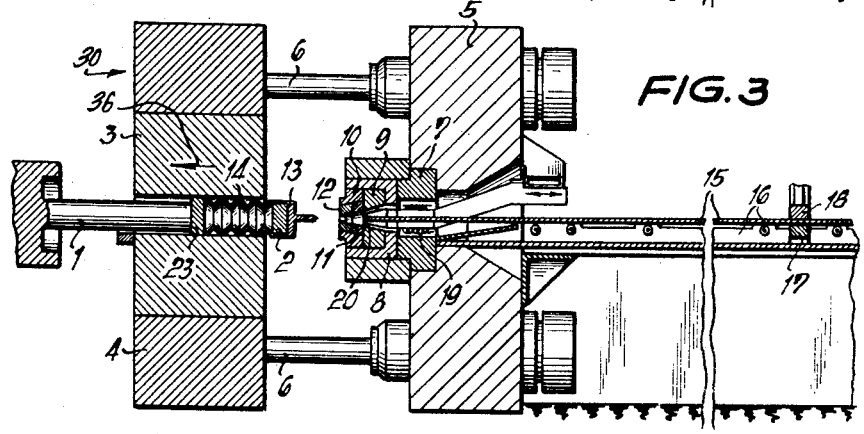

FIG. 7

INVENTORS
ERNST MÜLLER
GERHARD SEULEN

INVENTORS
ERNST MÜLLER
GERHARD SEULEN

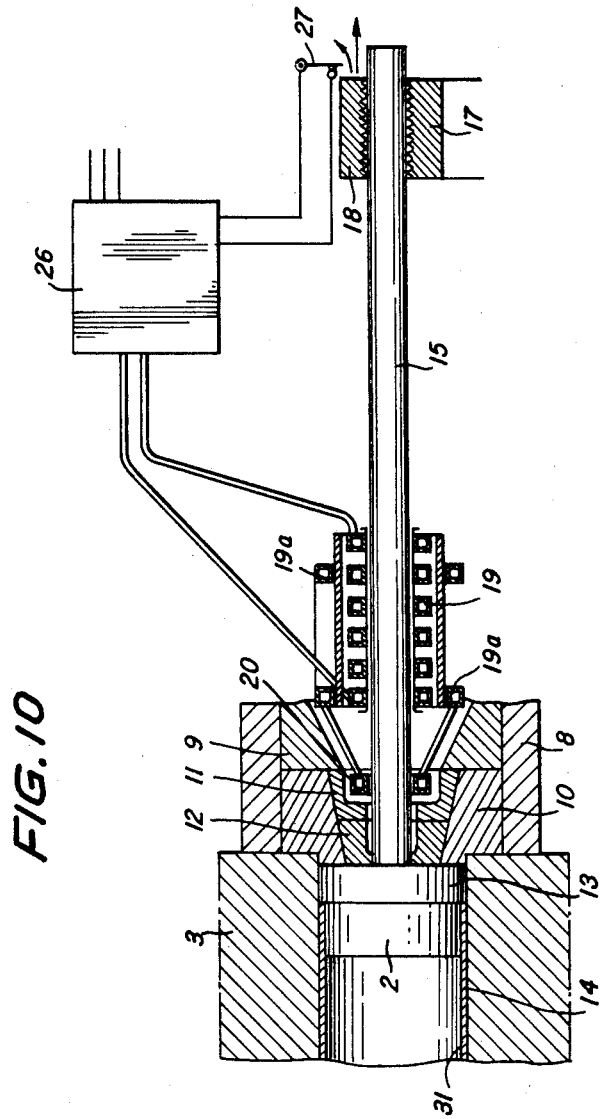

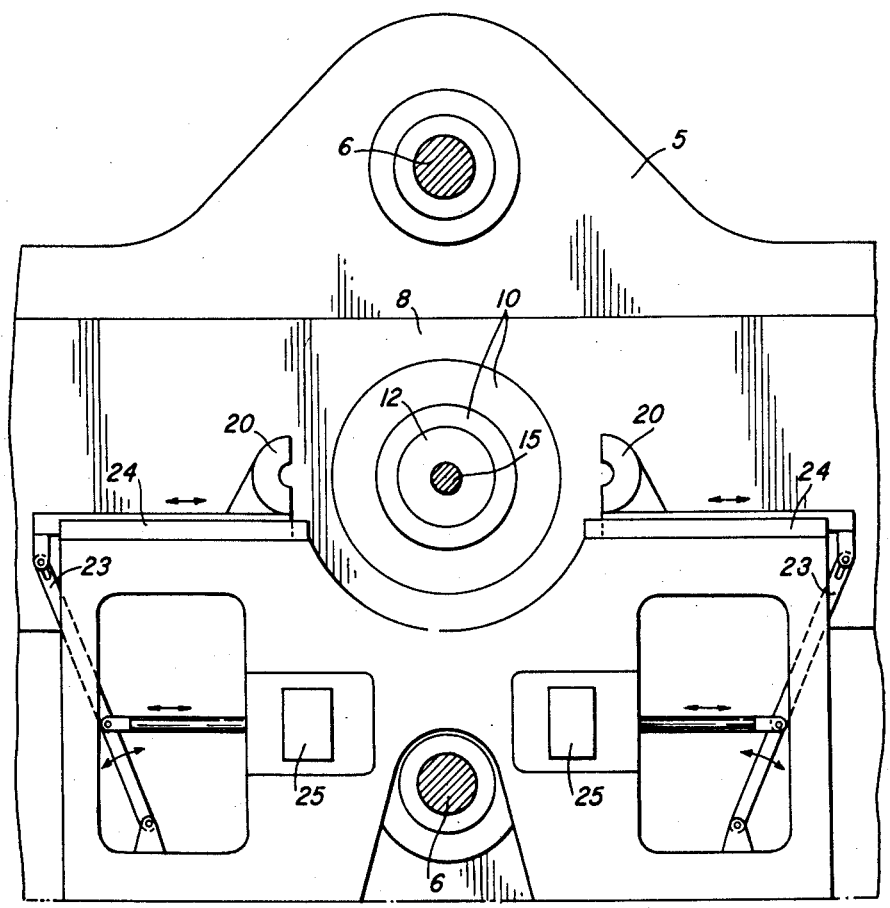

United States Patent Office 3,073,442
Patented Jan. 15, 1963

3,073,442
SYSTEM FOR THERMALLY SEPARATING THE STUMP FROM THE EXTRUSION AND FOR STRAIGHTENING THE LATTER IN A METAL ROD OR PIPE PRESS
Ernst Müller, Duisburg, and Gerhard Seulen, Remscheid, Germany, assignors to Hydraulik G.m.b.H., Duisburg, Germany
Filed Dec. 16, 1959, Ser. No. 859,950
Claims priority, application Germany Dec. 22, 1958
12 Claims. (Cl. 207—10)

The present invention relates to process and means for severing the burr or stump from an extrusion billet in metal extruding or pipe presses.

In metal extruding and pipe presses it is known practice to shear off or saw off the extruded work before or behind the extrusion die. With a view to general applicability of the press, a shearing tool or saw may be provided, to facilitate severance of profiles and like workpiece sections of different materials from the charge.

To move the saw and shearing device into and out of operative position, special arrangements and drives are needed which require a considerable structural change and construction expense and cause also expensive interruption of the operation of the press during stoppage and exchange of cutting or severance tools.

A marked disadvantage is shearing of the burr produced when shearing before the die takes places, which renders it difficult to subsequently draw or discharge the cut workpiece section through the die. In addition, it is necessary to make the support for the die strong enough to withstand the shearing forces, so as not to impair the precision of the centering of the die.

When sawing off the stump or burr ahead of the die, special protective measures and extreme caution are necessary for effectuating the removal of chips, so as to avoid with certainty any damage and fouling of sliding or fitting precision parts of the press.

If the extrusion workpiece or bar is severed mechanically rearwardly of the die, a longer piece of scrap or waste from the extrusion piece results which extends between the stump of the extrusion billet and the point of separation or severance.

When pressing occurs with lateral movability of the die, it is, moveover, often difficult and necessitates additional structural expense to provide a sufficient space for the motion of severing means and to absorb considerable forces occurring during severing performance.

To avoid these and other disadvantages it is now proposed according to the invention to heat the extrusion piece ahead or rearwardly of the die to a relatively high temperature or to melt the piece by means of thermally operated severing means.

The invention contemplates further improvements in this respect and proposes a process for severing the press rest or stump through electric induction and takes also into consideration means for carrying out this process.

A known process for mechanically severing the stump from the extrusion workpiece in front of the die is to withdraw the receiver a sufficient distance after termination of the extruding operation, so as to leave enough space between it and the stump to introduce for operation a shearing or like cutting tool. The ram then retains the disk and the stump at the die at first, being pulled back only when the pot is retracted and has released the stump. Thereupon the shearing tool engages the stump adhering to the die and pushes it aside, so that subsequently the shearing tool is able to reach and sever the workpiece section along the edge of the die.

When pressing with a "shell," the stump is often sawed off. By simultaneous retraction of the pot and ram, the stump is pulled away from the die a distance in a direction counter to the pressing direction. Thereupon the exposed sectional extrusion piece is severed between stump and die by means of the introduced saw or like tool.

Thereafter, the saw or like tool is retracted, and the shell, disk, and stump are ejected from the pot by means of the ram.

In such presses, which are equipped with a "lock head" retractable rearwardly by a counter-stop or head and containing the die, this lock head is detached from the pot by means of the ram together with the stump after it has been unlocked, and is retracted rearwardly, where the severing takes place in the same manner as described.

This severing of the stump not only requires a relatively high cost and space for the severing tools, but also an expensive time factor is involved to carry out the various additional operations in the manner described.

The invention has for one of its objects to provide means contributing to a highly economical severing method by employing thermal severing means thereby avoiding high expense through time consumption and cost required by long cutting operations simultaneously permitting rapid severing without formation of shearing burrs or chips, so that very little waste of extruded material occurs.

The invention further contemplates a straightening effect to be exerted on the extrusion workpiece at the same time of performing the thermal opertaional steps. The process of the invention aiming at the thermal severing of the stump rearwardly of the die consists in that after termnation of the extrusion operation the extruded shape or workpiece is first heated by high, intermediate, or line frequency induction means and simultaneously a traction or pulling force is applied to one or both parts to be severed, so that also a straightening effect is produced. If a sufficient softening at the point of separation is brought about, a constriction preceding the severing operation is caused which leads to the severance, and a retraction of the pot and of the stump adhering to it, as the severed stump is withdrawn from the die, whereupon both these parts are ejected from the pot in a manner known per se.

For carrying out this severing process the extrusion press is equipped with a frequency generator which connects through a transformer with a heating coil acting as induction means which surrounds the extrusion workpiece to be severed and is disposed either in fixed or movable condition as close as possible rearwardly of the die opening. For adaptation to various and irregular sectional shapes the heating coil is provided with an amplifier and is arranged to be interchangeable.

Pursuant to another embodiment of the invention, when severing the extrusion before the die, after termination of the extruding stroke of the ram, the pot is retracted a small distance together with the stump and the extrusion, and the amplifier, which comprises two or more separate heating coils supplementing each other to form a closed induction circuit, is moved into the resultant space. The extrusion to be severed is then heated by high, intermediate, or line frequency induction, and at the same time traction is exerted on one or both parts of the extrusion to be severed so as to effect constriction at the point of separation. This results in fracture of the extrusion and the stump is then removed in a manner known per se by return of the pot and the extrusion is removed by extraction from the press.

In order to effect the severing operation the press is provided with a high or intermediate frequency generator system provided with a high voltage transformer and an inductor disposed adjacent the die for local heating of the extrusion to be severed, which system can be connected or disconnected by means of a press control after termination of the ram stroke. The inductor consists of two or more projectable or displaceable heating coils which in projected position thereof supplement each other to form an induction circuit surrounding the extrusion to be severed, and which are retractable into a protected and inoperative position which does not impede the press operation. Here, too, the heating coils or the amplifiers are interchangeable for adaptation to various sectional shapes of associated press parts.

According to another feature of the invention, there is inserted between heating coil means, or between the amplifier and the high voltage transformer a plug in order to facilitate quick disconnection of these parts. For heating coils which are movable transversely of the pressing direction, the plug connection is disconnected after a longitudinal displacement of the parts to be separated in pressing direction followed by subsequent moving apart transversely of the pressing direction.

According to another feature of the invention, the heating coil is surrounded, in particular for protection against mechanical shock, by a non-conductive material of high thermal and mechanical strength, for example, sintered aluminum oxide or is embedded in such a material.

The exertion of traction to effect the constriction of the extrusion at the point of separation can be accomplished, according to the present invention, by means of an extracting carriage provided with a clamping device and a drive operative in the pressing direction. It is also possible to exert traction on the stump in a direction opposite to the pressing direction to effect the constriction at the point of separation. For this purpose the pot provided with a drive is moved in opposition to the pressing direction.

These and other objects of the invention will become further apparent from the following detailed description, reference being made to the accompanying drawings showing preferred embodiments of the invention.

In the drawings, which illustrate the best modes presently contemplated for carrying out the invention:

FIGS. 1 to 3 are diagrammatic sectional illustrations of an extrusion press pursuant to the present invention, and show different stages involved in severing the extrusion rearwardly of the die;

FIG. 7 illustrates, on an enlarged scale, the device for severing the extrusion rearwardly of the die;

FIG. 10 is a diagrammatic sectional view of another embodiment of the invention; and FIG. 11 is an end elevation of the extrustion die with retractable heating coils.

Figure 4:
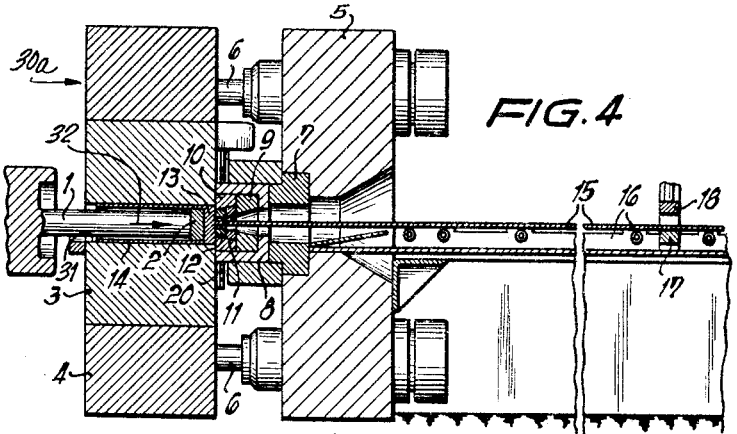
FIGS. 4 to 6 are views similar to FIGS. 1 to 3 and illustrate different stages involved in severing the extrusion forwardly of the die.

Referring now to FIGS. 1 to 3 of the drawings in detail, there is shown an extrusion press 30 provided with a ram 1 which is reciprocable in a ramway 31. The ram disk 2 is advanced within the ramway in the direction of arrow 32 by the ram so as to press the billet or charge to effect the extruding operation. The ramway is defined within the press pot billet container or work receiver 3 which is mounted in the pot holder 4. The pot holder 4 is movable relative to a counter-stringer 5 by drive plungers 6—6.

The press tool 33 is mounted by the counter-stringer. As here shown, the tool comprises a pressure plate 7, a tool mount 8, a backing member 9, a die holder 10, a die backing member 11, and an extruding die 12. When the billet is forced through the die, as shown in FIG. 1, there is formed a stump 13 at the forward end of the ramway, a shell 14 integral with the stump and extending rearwardly into the ramway, and the extrusion or extruded product 15 which extends forwardly outwardly of the ramway.

The extrusion is forced by the ram onto a rollerway or rolltable 16 being engaged thereon by the longitudinally movable extraction carriage 17 which is provided with an extrusion clamping device 18. The induction severing means includes a frequency generator connected by means of the high voltage transformer 19 to the induction heating coil 20.

In FIG. 1, the ram 1 has completed its press stroke in the direction of arrow 32 to form the extrusion 15. The extrusion is now heated, at the point at which it is to be separated from the stump 13, by the heating coil 20 through which it extends, as best seen in FIG. 7.

While being heated, the extrusion is gripped by the clamping device 18 of the extraction carriage 17, as best shown in FIG. 2, and traction is imparted by the carriage to the extrusion. As a result, a more or less intensive constriction of the extrusion is formed at the heated point of separation thereof. This greatly facilitates the extraction of the severed stump from the die 12.

As best shown in FIG. 2, while the point of separation of the extrusion is being heated, the ram 1 is retracted, as shown by arrow 34 and an ejection disk 23 is placed in front of the ram, at the entrance of the ramway, as shown by arrow 35. Immediately after the extrusion is severed, the press pot 3 is retracted in the direction of arrow 36 (FIG. 3) by the plunger 6—6. Advancing ram 1 while the plungers 6 remain extended causes the stump 13 provided with the shell 14, to be ejected from the pot by means of the ejecting disk 23 which abuts the forward end of the ram 1. Simultaneously therewith, the completed pressed extrusion 15 is extracted from the press by movement, in the direction of arrow 32 or the pressing direction, by the extraction carriage to which it is clamped by the clamping device which had gripped the extrusion as shown by arrow 37 in FIG. 2.

Figure 7:
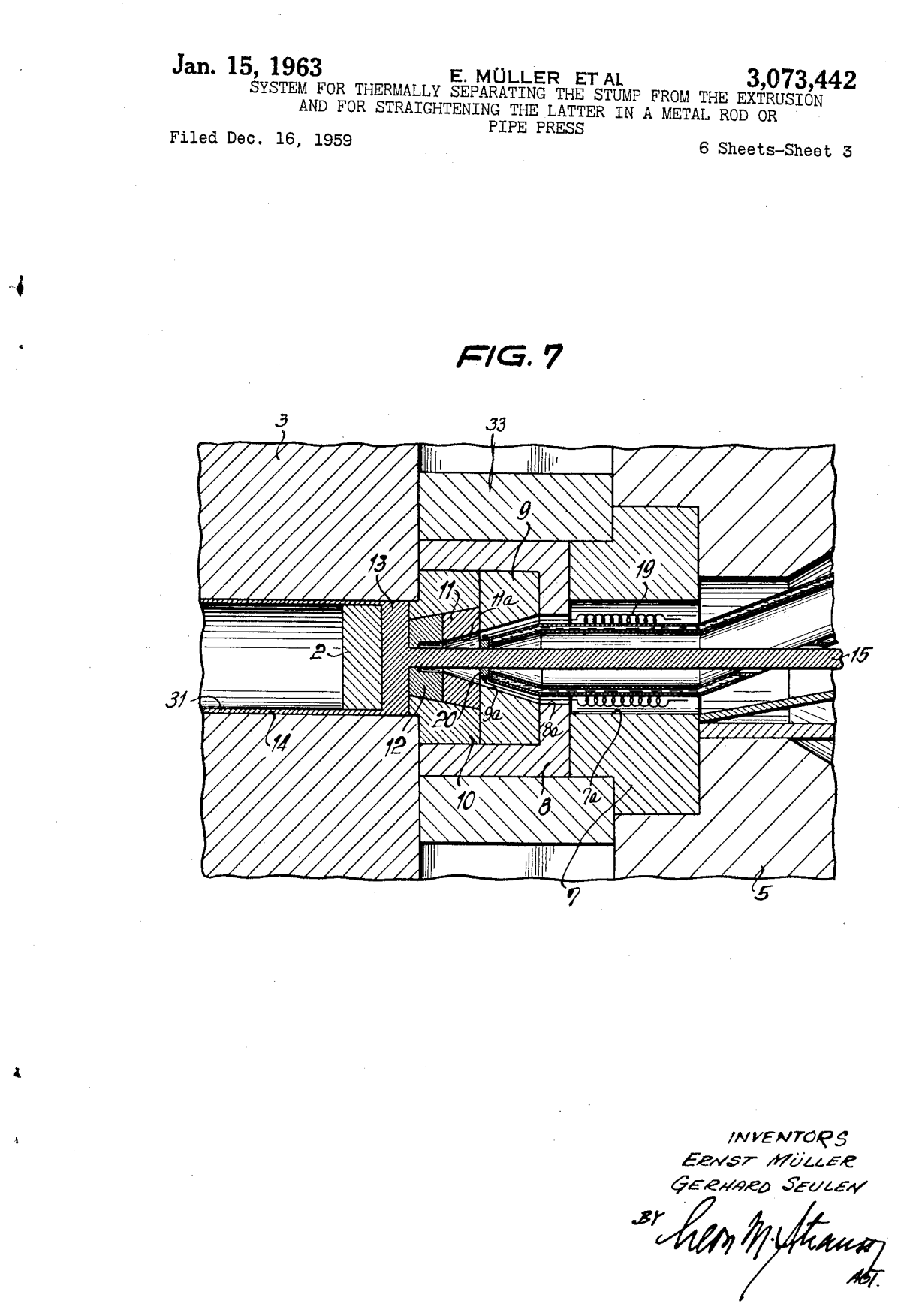

FIG. 7 illustrates the disposition of the heat concentrator coil 20 behind the die 12 in the tool mount. The backing member 11 for the die 12 has a bore 11a which is large enough to allow for the placement of the heating coil 20 directly behind the die 12. The backing member 9, the tool mount 8 and the pressure plate 7 are provided with enlarged bores 9a, 8a and 7a, respectively, to allow for the placement of the high voltage transformer 19 adjacent to the heater coil 20.

Figure 5:
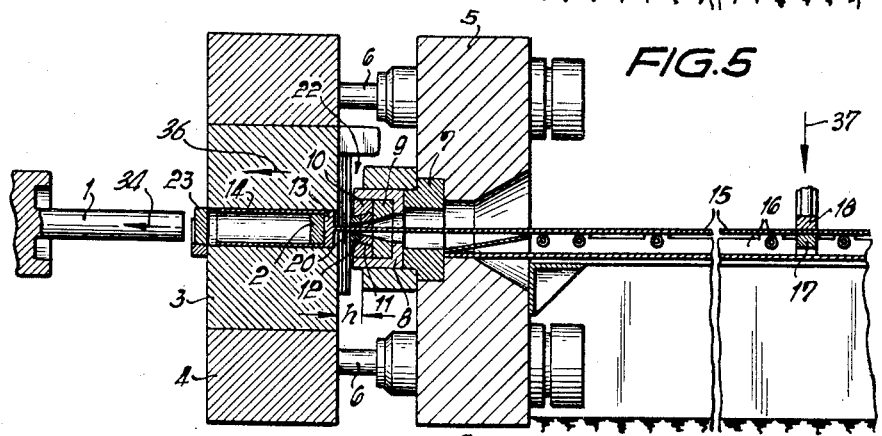
Figure 8:
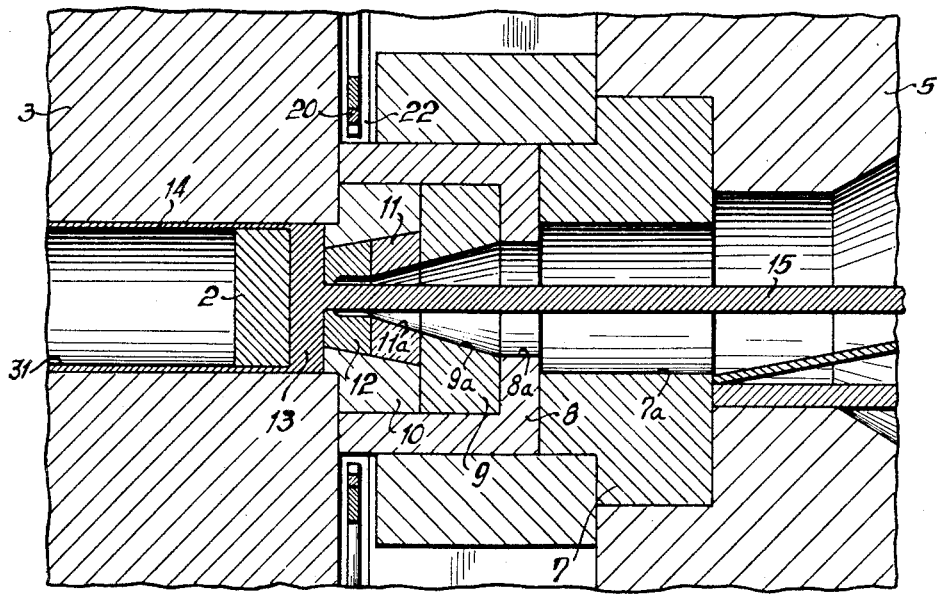
FIGS. 8 and 9 illustrate different positions of the device for severing the extrusion forwardly of the die.
Figure 9:
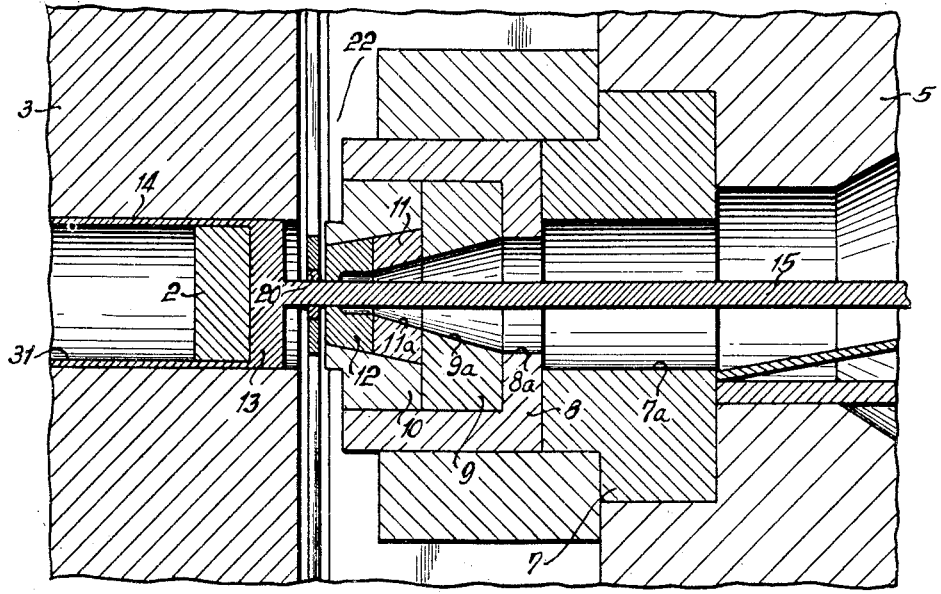

Referring now to FIGS. 4 and 6, 8 to 11 in detail, there is shown another embodiment of the present invention in which the extrusion press 30a is provided with a heat-concentrating coil 20 formed in two parts and which can be retracted or withdrawn from the center of the press. After the ram 1 has completed its forward pressing or work stroke in the direction of arrow 32, as shown in FIG. 4, the pot or work holder 3 is retracted, as shown by arrow 36 in FIG. 5, through a return stroke equivalent to the distance indicated by reference character "h." This creates a space between the confronting faces of the billet container 3 and the die 12, as best shown in FIG. 9, which permits the two part heat-concentrator coil 20 to be advanced from its retracted or inoperative position, shown in FIGS. 4 and 8, into a projected or operative position in the center of the press, as shown in FIGS. 5 and 9.

It will be understood that in the retracted position thereof, the two parts of the heat concentrator coil 20 are locked in their inoperative position in the spaces formed by recesses 22 defined in the tool mounting means 7—8.

Figure 6:
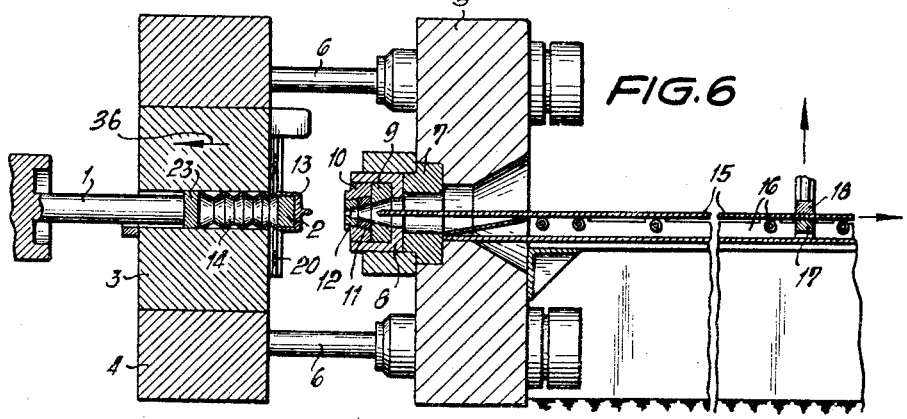

With the coil in its operative position, the extrusion 15 is heated and concomitantly therewith the clamping device 18 of the previously described extraction carriage 17, which is moved in the direction of arrow 32, exerts sufficient traction to produce a constriction in the extrusion at the point of separation thereof. During this operation, ram 1 is completely retracted from the work receiver 3, in the direction of arrow 34, as shown in FIG. 5. The ejection disk 23 is then placed in front of the ram at the inlet to the ramway 31. Thereafter, the two parts of the heat concentrator coil 20 are retracted to their inoperative position, as shown in FIGS. 6 and 11.

The work receiver 3 is now completely retracted in the direction of arrow 36 (FIG. 6) by means of the drive plungers or pistons 6—6. Upon complete retraction of the work receiver 3, the stump 13 and integral shell 14 are ejected from the work received 3 by the ejection disk 23, as shown in FIG. 6, and by means of the extraction carriage 17, the extrusion 15 is removed from the press by being moved over the roller table 16.

FIG. 10 shows further details of the automatic switching off of the high frequency generator 26 from primary spool 19 and secondary spool 19a of the transformer by means of limit switch 27 actuatable by carriage 17 and clamp 18 upon movement of the same after severing operation.

FIGS. 8 and 9 illustrate on an enlarged scale the inoperative disposition of the two part heater 20 in FIG. 8 and its operative position in FIG. 9. The recesses 22 provided in the tool mount 8 create sufficient space to accommodate and protect the two-part heating coil in the inoperative disposition thereof, to which coil parts 20 are moved along guideways 24 by means of lever and electro-magnetic actuators 23, 25 (FIG. 11).

In the projected or advanced and operative position thereof, the two parts of the heating coil form a closed induction circuit which encompasses the extrusion 15 and by means of which the heating and severing of the extrusion directly at the stump is effected.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In an extrusion press having a work holder and a die mounted for relative movement, a ramway provided in said work holder and a ram operable in said work holder to extrude a billet positioned therein through said die, that improvement which comprises induction heating means operable to heat the extrusion adjacent the stump of the billet remaining in said ramway, means to subject the extrusion to traction to remove the extrusion from the stump, and means to extract the severed extrusion from the press.

2. An extrusion press as set forth in claim 1, wherein said heating means comprises a heating coil disposed adjacent to the outlet end of the die and through which the extrusion passes as it leaves the die.

3. An extrusion press as set forth in claim 1, wherein said heating means comprises heating coil means movable from a retracted inoperative position clear of press movement to a projected operative position encompassing the extrusion adjacent to the inlet end of the die.

4. An extrusion press as set forth in claim 3, wherein said heating coil is a two-part coil.

5. An extrusion press as set forth in claim 1, wherein said heating means comprises heating coil means removably connected to said press, whereby heating coil means complementary to different extrusion shapes may be readily inserted in the press.

6. An extrusion press as set forth in claim 1, wherein said heating means comprises an induction heating coil, transformer means, and plug type connector means for effecting a series connection between said coil and transformer means.

7. An extrusion press as set forth in claim 1, wherein said heating means comprises an induction heating coil, transformer means, and plug type connector means for effecting a series connection between said coil and transformer means, said coil and transformer means being relatively movable in the work stroke direction of the ram to disconnect said connector means.

8. A method of extrusion comprising extruding a billet through a die to form an extruded product, applying heat to the product adjacent the die after a product of desired length has been formed, and applying tension to the product to neck down the material at the location of such heat and thereafter to break the product away from the remaining material.

9. An extrusion device comprising an extrusion die, means to extrude a billet through said die to form an extruded product, means adjacent said die to heat said extruded product, and means to apply tension to said extruded product in the heated condition to neck down said product at said heating location and to break it away from the remaining stump material.

10. An extrusion device according to claim 9, wherein said heating means includes an induction coil and switch means connected to said induction coil for activating the latter including a portion disposable in the path of movement of said extruded product to deactivate said coil upon movement of said product by a predetermined amount under tensioning.

11. An extrusion device according to claim 9, wherein said means to extrude a billet includes a movable ram, said means to apply tension to said extruded product including clamping means, and means to displace said die in a direction away from said product and to break the stump away from the extruded product.

12. An extrusion device according to claim 11, including means for ejecting the stump from the extrusion die after the stump has been broken away from the extruded product.

References Cited in the file of this patent

UNITED STATES PATENTS

| | | |
|---|---|---|
| 604,137 | Bishop | May 17, 1898 |
| 2,337,804 | Dempsey | Dec. 28, 1943 |
| 2,393,155 | Gaspar | Jan. 15, 1946 |
| 2,507,817 | Ropp et al. | May 16, 1950 |
| 2,600,034 | Weingart | June 10, 1952 |
| 2,728,453 | Thweatt et al. | Dec. 27, 1955 |
| 2,893,552 | Davies | July 7, 1959 |
| 2,930,482 | Hanes | Mar. 29, 1960 |
| 2,954,869 | Swanson | Oct. 4, 1960 |